Oct. 23, 1923.
O. J. BERG
1,471,441
DISPENSING DEVICE FOR LIQUIDS
Filed Feb. 20, 1922
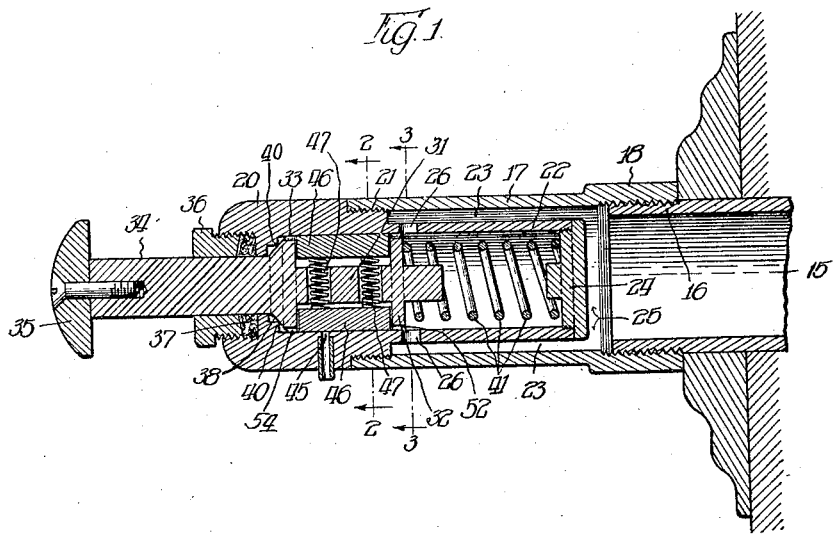
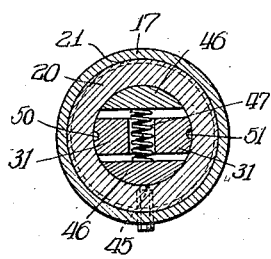
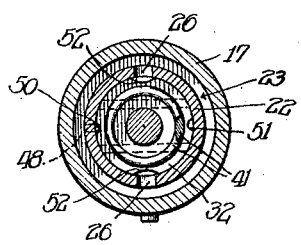
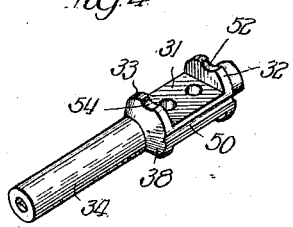
Witness:
R. Burkhardt.
Inventor
Oliver J. Berg
By Luther Johns
atty.

Patented Oct. 23, 1923.

1,471,441

UNITED STATES PATENT OFFICE.

OLIVER J. BERG, OF OAK PARK, ILLINOIS.

DISPENSING DEVICE FOR LIQUIDS.

Application filed February 20, 1922. Serial No. 537,851.

*To all whom it may concern:*

Be it known that I, OLIVER J. BERG, a citizen of the United States, residing at Oak Park, Cook County, Illinois, have invented certain new and useful Improvements in Dispensing Devices for Liquids, of which the following is a specification.

These improvements relate to means for discharging a quantity of liquid from a source of supply. In my practice the device is used for dispensing liquid soap, to which use it is peculiarly well adapted.

Devices for this general purpose have been hitherto suggested, and it is old to provide a dispensing mechanism which operates through the instrumentality of a plunger which may be forced into a chamber to displace the liquid therein. Various difficulties have been observed in the use of hitherto suggested liquid dispensing devices, among which may be mentioned that of maintaining the liquid against leakage, and this has been particularly true in liquid-soap dispensers since the particles of that commodity move very freely upon each other and the liquid will ordinarily escape through exceedingly fine crevices or passageways. Other objections have been the necessity of frequent cleaning or adjustment of parts to maintain a device in an operative condition.

The principal objects of the present improvements are to provide a dispensing device in which the liquid may be held securely against leakage; one of such construction that its safety provisions will remain effective throughout an exceedingly long period of time; one of simple construction and which is not likely to get out of order, and which does not call for adjustment or attention to maintain it in effective condition except possibly for occasional packing or tightening of the external packing gland, as usual with such packing; one which is exceedingly strong and capable of withstanding hard usage without injury; one in which wear upon interior valve parts is automatically taken care of throughout the life of the device; one which may occupy but a small amount of space; and one in which, through wear of valve parts, the valve elements tend to become even more perfectly fitted together. It is a general object to provide a device of unusual utility through simplicity, strength and arrangement of parts.

In the accompanying drawings, which form part of this specification, Figure 1 is a medial vertical longitudinal section through my improved device in a very simple, compact and effective form. Figures 2 and 3 are transverse sections, as on the line 2—2 and 3—3 respectively of Figure 1; and Figure 4 is a perspective of the plunger frame and stem.

The improved construction illustrated is shown as a tubular device which will extend ordinarily in a horizontal direction from some supply pipe as 15 which may project through a wall and be provided with the threaded end 16. This adaptation will be found suitable for wash-rooms where it is desired to dispense from time to time a small quantity of soap such as the user may require. According to this adaptation the construction includes a tubular member 17, the walls of which define a supply chamber having its end at 18 interiorly threaded whereby it may be screwed upon the supply pipe at 16.

Means forming a plunger chamber are shown as a cylindrical member 20 threaded upon the outer end of the supply chamber 17 at 21. The plunger cylinder has a cylindrical part 22 extending into the hollow interior of the cylinder 17 spaced from the walls thereof whereby an annular passageway 23 is formed between these walls. The inner end of the plunger chamber extension 22 is closed by a readily applicable plug 24 threaded into the cylinder walls. Between the end of the pipe 16 and the plug 24 is a space 25 whereby a quantity of liquid from the pipe 15 may pass freely from the pipe through the space 25 and into the annular passageway 23.

Intake openings are shown in the plunger chamber walls at 26, placing the interior of the plunger chamber in communication with the passageway 23. In practice a single intake 26 will suffice but the flow will naturally be more prompt with two such openings as shown, and the use of two such openings further provides that while the liquid is flowing from the pipe 15 through the lower opening 26 air may escape through the upper opening 26 whereby the plunger chamber may be more readily filled.

A plunger is provided which may be considered as originally consisting of a cylindrical head milled on opposite sides to provide an intermediate substantially flat part 31 leaving a flange-like retaining member 32 at one end and another 33 at the other end. A plunger stem 34 extends coaxially beyond the outer end of the plunger chamber part 20 and is provided at its outer end with a head or button 35. The packing gland 36 encompassing the stem 34 is shown as of ordinary construction and is adapted to compress packing 37 about the stem 34.

The flange-like part 33 is conically tapered at 38, and the part 20 is provided with an interior annular edge at 40 concentric with the conical surface 38 against which this beveled flange 33 is adapted to press under the influence of the coiled compression spring 41 operatively between the plug 24 and the shoulder or flange 32. The effect of this valve at 38 and 40 is to maintain the device free from leakage at the plunger stem 34 during the relatively long periods when the device is not in use. Experience has shown that owing to the very pronounced disposition of liquid soap to creep through exceedingly minute passageways it is almost impossible to maintain a supply of that commodity against leakage at a packed joint without constant supervision and attention, and it frequently happens according to some constructions that a fresh supply of a considerable quantity of such soap will have entirely disappeared over night through leakage at a packed joint or at a valve which is not entirely suitable to the object. According to these improvements there is provided an auxiliary seal intermediate the packing at 37 and the source of supply, except for the short intermittent periods when the plunger is operated at which times the packing at 37 maintains the device against leakage at the stem.

It will be noted that when the plunger is in normal position to be operated by a push upon the head 35 the plunger has cleared the intake ports 26 whereby the liquid may flow into the plunger chamber. Such liquid flow will ordinarily be gravitational, and we will assume that the source of liquid supply is on higher planes than those of the dispensing device. An outlet opening or port 45, through which the liquid is to be discharged, is shown as being spaced longitudinally of the plunger chamber a materially great distance from the opening or openings 26.

Valve means are shown as being carried by the plunger for closing the intake port or ports 26 and opening the outlet port 45 on the in-stroke of the plunger and for doing the reverse on the out-stroke. These valve means are shown as a pair of relatively long oppositely-positioned members 46 held loosely at their ends between the plunger extensions 32 and 33, these members 46 being shown as longitudinal sections of a cylinder having the diameter of the interior of the cylindrical plunger chamber. A pair of expansion coil springs 47 carried in holes in the plunger part 31 are arranged to press the valve members 46 apart and therefore constantly into engagement with the inner walls of the plunger chamber.

As well shown in the drawings the intake and outlet openings 26 and 45 respectively are in the paths of movement of the convex valve members 46 when the plunger is moved in and out. These valve members are maintained in that relation to the ports by means which restrain the plunger from turning on its axis. The plunger guiding means for this purpose are shown as a pin or projection 48 extending from the shell 20 into the plunger chamber and loosely into a longitudinal groove 50 in an edge of the plunger part 31.

Assuming that liquid has flowed into the plunger chamber through a port or ports 26 when the parts are in their normal position for use as shown by Figure 1, it is apparent that by pushing upon the head 35 the valve members 46 will be moved so as to close these intake ports 26, and that substantially simultaneously or very shortly thereafter the discharge port 45 will be opened by the sliding away therefrom of the overlying one of the valve members 46. Since the plunger stem 34 is of material thickness the entrance of a further amount of it into the plunger chamber reduces the capacity of the chamber to hold liquid. The only escape for the liquid is the outlet port 45 and the bulk of liquid discharged thereat on each in-stroke of the plunger is approximately that of the additional amount of the stem 34 forced into the chamber. The valve members 46 are long enough to maintain the intake ports 26 closed throughout the in-stroke of the plunger.

The plunger is not an inside-packed piston in this device and does not fit tightly upon the chamber walls except at the valve members 46. The plunger is more in the nature of an outside-packed piston, the packing being at the gland 36. For such a liquid as the soap product mentioned a very slight clearance between the flange-like part 32 and the chamber walls will permit the desired travel of the liquid from one end of the plunger to the other. This flange may be cut away at a place or two if desired, as at 52 to provide for more free travel of the liquid through or around plunger parts. The liquid also travels through the groove 50 and a similar groove 51 may be provided in the opposite edge of the plunger part 31. The seat-valve flange 33 will ordinarily not fit the cylinder walls tightly enough to prevent a free flow around its edge when the plunger is pushed inward, but gates may be formed in its edge also as at 54.

On the return stroke, induced by the spring 41, the intake ports 26 are maintained closed substantially throughout the stroke, but toward the end of the return or outward stroke the outlet 45 is closed and the intakes 26 are opened, whereupon another charge of the liquid flows into the plunger chamber.

A notable feature is that wear upon the sliding valve members 46 and upon the chamber surfaces on which they slide has the effect of fitting them together more accurately whereby instead of leakage with wear we find still greater security against such loss. This is highly important in a valve mechanism for such a slippery commodity as soap.

The particular shapes of the chambers and other parts shown are not essential to the operation of the device, but the shapes shown make for simplicity of construction, neatness in appearance, and effect a saving in cost over some other forms which might well be used. Various other changes of a mechanical nature may be made without departing from the spirit of the invention herein set forth, and I contemplate all such modifications or departures as fall within the scope of the appended claims.

I claim:

1. In a dispensing device of the character described, the combination of walls forming a chamber having an intake and an outlet for a liquid, a reciprocable plunger in said chamber, valve means carried by the plunger and adapted to slide upon the chamber walls having said intake and outlet and being adapted thereby to open and close them, said valve means being adapted to close the outlet and open the intake when the plunger is moved in one of its stroke directions and to close the intake and open the outlet when the plunger is moved in the opposite stroke direction, said valve means being mounted for relative movement toward the walls having the intake and outlet whereby a tight sliding fit may be maintained thereat, and spring means for pressing said valve means against said walls to maintain such tight sliding fit.

2. In a dispensing device of the character described the combination of walls forming a chamber having an outlet for a liquid, a reciprocable plunger in said chamber, a valve device carried by the plunger for sliding movement on the wall having said outlet, said valve device being mounted for relative movement toward said wall, spring means associated with said valve device for maintaining it with a tight sliding fit upon said wall, said chamber having an outlet for discharging liquid therefrom.

3. In a dispensing device of the character described the combination of walls forming a chamber having an intake for the passage into the chamber of a liquid from a source of liquid supply and having an outlet, a reciprocable plunger in said chamber, valve means carried yieldingly by the plunger and adapted to slide upon the chamber walls having said intake and outlet and to open and close the intake and outlet on stroke movements, and spring means associated with the valve means for maintaining the valve means with a good sliding fit upon the walls having the intake and outlet.

4. In a dispensing device of the character described the combination of walls forming a chamber having an intake opening for the passage into the chamber of a liquid from a source of liquid supply and having an outlet opening for discharging liquid from the chamber, a reciprocable plunger in said chamber, yielding valve means for alternately opening and closing said intake and outlet openings, spring means for maintaining said valve means in tight sliding contact with the walls having said openings, said valve means including a relatively long closure device carried by the plunger and arranged to move in a path occupied by one of said openings so as to close one of said openings on one plunger stroke and maintain it closed throughout a materially large part of that stroke and to open it on the reverse stroke.

5. In a dispensing device of the character described the combination of walls forming a chamber for a liquid supply, walls forming a plunger chamber having an intake opening in communication with said supply chamber and a discharge opening for the liquid to be dispensed, a reciprocable plunger in said plunger chamber, two relatively long closure devices carried yieldingly by the plunger for said openings respectively, spring means for maintaining said closure devices in contact with the walls having said openings, said closure devices being arranged to overlie said openings respectively in opening-sealing position during a materially large part of a stroke of said plunger, said openings being so arranged that the discharge opening is closed and the intake opening is open during a materially large part of the plunger stroke in one direction and the intake opening is closed and the discharge opening is open during a materially large part of the plunger stroke in the opposite direction, and means for reciprocating the plunger including means adapted to displace liquid in the plunger chamber on one stroke of the plunger.

6. In a dispensing device of the character described the combination of walls forming a chamber for a liquid supply, walls forming a plunger chamber having an intake opening in communication with said supply chamber and having a discharge opening for the liquid to be dispensed, a reciprocable plunger in said plunger chamber and defining passageways whereby liquid in the plunger chamber may flow from end to end of the plunger, two relatively long closure devices carried by the plunger for said openings respectively, said closure devices being arranged to overlie said openings respectively in opening-sealing position during a materially large part of respective strokes of said plunger, spring means for holding said closure devices in such closure-overlying and sealing position, said openings being so arranged that the discharge opening is closed and the intake opening is open during a materially large part of the plunger stroke in one direction and the intake opening is closed and the discharge opening is open during a materially large part of the plunger stroke in the opposite direction, and means for reciprocating the plunger including means adapted to displace liquid in the plunger chamber on one plunger stroke.

7. In a dispensing device of the character described, the combination of walls forming a tubular chamber for a liquid supply and having means for connecting it to a source of supply, walls forming a tubular plunger chamber, there being interengaging means between the walls of said two chambers for securing them tightly to each other with the plunger chamber partly within the supply chamber, a readily removable closure for the end of the plunger chamber within the supply chamber, a reciprocable plunger in the plunger chamber, a plunger stem extending from the plunger beyond the outer end of the plunger chamber, a readily removable packing device for closing the outer end of the plunger chamber where said stem emerges therefrom, the plunger chamber walls having an intake opening and a discharge opening, the intake opening communicating with the supply chamber, valve means on the plunger for alternately opening one of said openings and closing the other thereof as the plunger is moved in a stroke direction, the arrangement being such that the discharge opening is open on an inward stroke of the plunger whereby the movement of the stem into the plunger chamber displaces liquid therein and causes it to issue from the discharge opening.

8. In a dispensing device of the character described the combination of cylindrical walls forming a plunger chamber having an intake opening and an outlet opening for a liquid to be dispensed, walls forming a supply chamber into which said plunger chamber extends, said plunger chamber having an opening placing said chambers in communication with each other and having also a discharge opening, a reciprocable plunger in said chamber, yielding valve means carried by the plunger and arranged to move in paths occupied by said openings respectively so as to close and open each of them to receive liquid into and discharge it from said plunger chamber, means for maintaining said yielding valve means in contact with the walls having said openings, a cylindrical plunger stem partly within and partly without said plunger chamber, a packing gland where said stem emerges from said plunger chamber, an annular valve seat adjacent to said gland and within said plunger chamber, an annular valve carried by said stem and adapted to contact said seat when the stem is in its outermost position, and spring means for maintaining said stem yieldingly in its outermost position.

OLIVER J. BERG.